N. M. LA PORTE.
BOTTLE FILLING MECHANISM.
APPLICATION FILED MAR. 29, 1911.
1,166,607.
Patented Jan. 4, 1916.
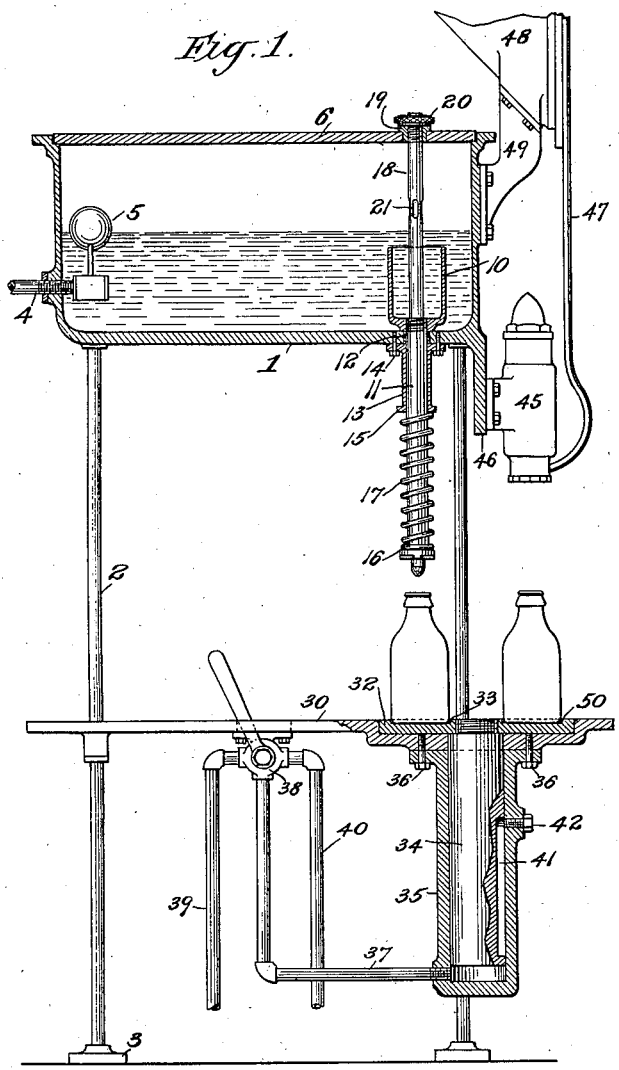
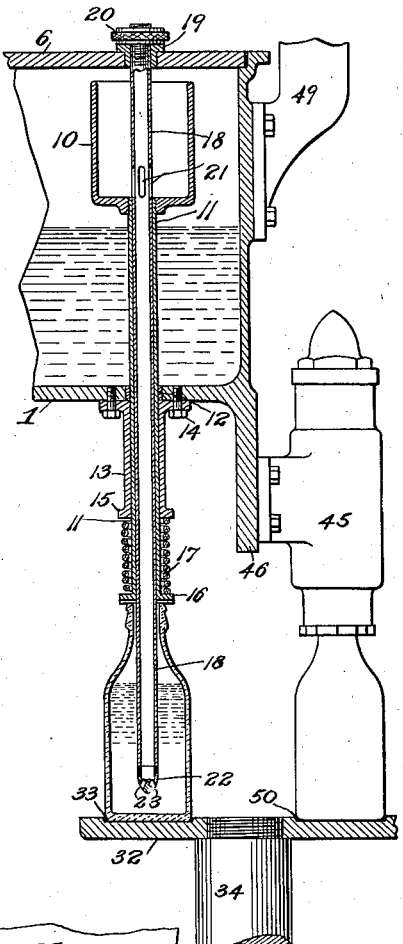
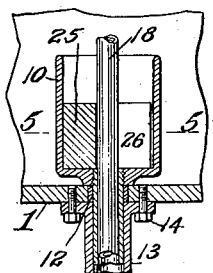
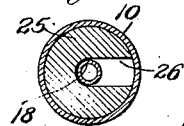

UNITED STATES PATENT OFFICE.

NORBERT M. LA PORTE, OF BALTIMORE, MARYLAND, ASSIGNOR TO THE CROWN CORK & SEAL COMPANY OF BALTIMORE CITY, OF BALTIMORE, MARYLAND, A CORPORATION OF MARYLAND.

BOTTLE-FILLING MECHANISM.

1,166,607.   Specification of Letters Patent.   Patented Jan. 4, 1916.

Application filed March 29, 1911.   Serial No. 617,603.

*To all whom it may concern:*

Be it known that I, NORBERT M. LA PORTE, a citizen of the United States, residing at Baltimore, State of Maryland, have invented certain new and useful Improvements in Bottle-Filling Mechanism, fully described and represented in the following specification and the accompanying drawings, forming a part of the same.

This invention relates to certain improvements in filling mechanisms, and has been designed particularly for use with bottle capping machines, though if desired it may be used in other relations.

It is one object of the present invention to provide an improved filling mechanism for bottles and like articles by which a predetermined quantity of liquid may be measured out from a suitable liquid supply and delivered to the bottle.

It is a further object of the invention to provide an improved filling mechanism which shall deliver a predetermined quantity of liquid to the bottle or like article to be filled, which quantity may be varied, so that the mechanism may be employed for accurately filling bottles intended to hold a quart, pint or half-pint.

It is a further object of the invention to provide such a filling mechanism to coöperate with a capping mechanism so that while an article is being filled a similar filled article may be capped.

In the accompanying drawings, which represent the invention in one of its preferred forms—Figure 1 is a side elevation partly in section of the improved filling mechanism and a capping mechanism; Fig. 2 is a view partly in section on an enlarged scale of part of the mechanism shown in Fig. 1, the parts being shown in filling and capping position. Figs. 3 and 4 are detail views of the measuring device showing a means for varying the quantity of liquid measured out, and Fig. 5 is a section on line 5—5 of Fig. 3.

Referring now to the drawings, there is provided by the present invention a liquid supplying means from which the liquid is measured out, which may vary widely in construction. As shown, these means include a tank 1, of suitable construction and capacity, which may be supported by frames or standards 2 rising from suitable supports 3. The tank 1 is in communication with a suitable source of liquid supply, as pipe 4, through which liquid is supplied to the receptacle, the amount of liquid so supplied being controlled by a float valve indicated generally by the numeral 5. In the best constructions the tank is provided with a closing means as a removable cover 6.

Means are provided for measuring out a predetermined quantity of liquid from the tank 1, and connections for delivering such liquid to the bottle or other similar article to be filled. In the best constructions, a measuring device is employed located in the tank and normally held below the surface of the liquid in the tank, so as to be kept normally filled with liquid. The connections by which the measured out liquid is delivered to the article to be filled includes means for moving the measuring device out of the liquid in the tank, and a filling conduit to which the liquid measured out by such measuring device is delivered by the measuring device, these means, in the best constructions, being actuated by the article to be filled. As shown, there is provided a receptacle in the form of a cup 10, which is capacitated to hold, when full, the maximum amount of liquid which it is desired to measure out, as, for instance, a quart, and which is arranged to be normally held below the surface of the liquid in the tank. Suitable means for so holding the cup 10 are provided. As illustrated, the cup 10 is screwed or otherwise secured so as to form a tight joint on one end of a tube 11 which has a vertical sliding movement through the bottom of the tank 1, suitable packing 12 being provided where the tube passes through the bottom of the tank. Extending downward from the bottom of the tank is located a tube or sleeve 13 suitably secured by bolts 14, in which sleeve the tube 11 is adapted to slide. The sleeve 13 thus acts as a guide and is provided with a flange or collar 15 between which and a flange or collar 16 on the end of the tube 11 opposite the cup is located a spring 17 which acts to normally hold the cup 10 against the bottom of the tank below the surface of the liquid therein.

The cup 10 is lifted or raised above the surface of the liquid, thereby measuring out a predetermined quantity of such liquid by forcing the tube 11 upward against the spring 17, this upward movement being effected preferably by the article to be filled, as, in the present instance, by a bottle, the neck of the bottle contacting with the flange 16 before referred to, which is of a little larger circumference than the bottle neck.

The connections provided by which the liquid measured out by the measuring cup 10 is delivered to the bottle may be varied. Preferably these connections are of such character as to enter the bottle or other article to be filled, and so arranged that the liquid from the measuring cup is delivered directly thereto, so that the quantity measured out by the measuring cup will be delivered without loss of liquid during the delivering operation, and the exact quantity measured out by the measuring cup will be delivered to the bottle. As illustrated, there is provided a filling conduit 18 which is stationary relatively to the measuring receptacle 10, this filling conduit comprising a hollow tube adapted to fit within the tube 11 before referred to with a sliding fit, and extending through the tank vertically and suitably secured at its upper end, as by threaded plug 19 and nut 20, in the cover 6. The filling conduit 18 is thus positioned within the measuring cup or receptacle 10, and the cup is adapted to be moved along the conduit. The conduit is provided with a filling opening or openings 21, located above the surface of the liquid in the tank, to which openings the cup 10 delivers the liquid measured out by it as the cup is raised. The lower or delivery end of the filling conduit is somewhat rounded off in order that it may more certainly and easily pass into the bottle neck. As shown, the delivery end consists of a plug 22, this plug being inserted into the conduit and provided with discharge openings 23 through which liquid is discharged into the bottle.

The measuring device so far described is capacitated to hold when full the maximum predetermined quantity of liquid which it is desirable to measure out and deliver to the articles to be filled. In many instances it is desirable that a predetermined quantity of liquid less than the maximum be measured out and delivered, and means for effecting this are provided by the present invention, which may be of any suitable character. Preferably there are provided filling plugs 25 of dimensions sufficient to displace a certain quantity of liquid, leaving the required quantity in the cup. These plugs 25 are of such character that they may be readily inserted and removed from the measuring cup. As shown, the plugs are provided with slots 26, by which they can be inserted in the cup around the conduit 18, the conduit 18 passing through the slots.

With the construction so far described, it will be seen that a very simple and efficient mechanism has been devised for measuring out a predetermined quantity of liquid from a suitable supply and accurately delivering the liquid so measured out to the article to be filled. While the articles might be presented, if desired, to the filling mechanism by hand, in the best constructions there will be provided means for supporting the article and means for moving the support to bring the articles to filling position. In the particular construction illustrated, there is provided a support 30 suitably mounted on the standards 2 before referred to, this support being recessed to receive a table 32 provided with a bottle holding recess 33 which holds the article while it is being filled. This table may be variously supported. As shown, the table 32 is carried on the upper end of a piston 34 so as to move with it. The piston 34 is adapted to work in a cylinder 35 suitably secured as by bolts 36 to the support 30, and is operated in any suitable manner, as by compressed air, or hydraulic pressure, through pipe 37 and valve 38, and inlet and exhaust pipes 39 and 40. The table 32 is properly located below the end 22 of the filling conduit 18 before referred to and when raised by piston 34 the delivery end of the filling conduit enters a bottle carried by the table. To prevent the table from rotating and so carrying the bottle out of register with the end of the filling conduit, the piston is slotted as shown at 41 to receive a set screw 42, this set screw preventing the support from rotating and providing a stop for the piston and preventing it from rising too far.

If desired, the invention may be employed in conjunction with capping mechanism, and is so intended to be used. When it is so employed, the capping mechanism will be so arranged that while one bottle is being filled, another like bottle will be capped. As shown, there is provided a capping mechanism 45 of any suitable type, which is or may be supported on a bracket 46 extending from the tank 1. Caps are supplied to this capping mechanism through a cap supply conduit 47 connecting with a hopper 48 carried on a bracket 49 likewise extending from the tank 1. When this capping mechanism is employed, the table 32 before referred to is constructed with a second bottle holding recess 50 for holding a bottle to be capped. When this construction is employed, the bottle to be filled and the bottle to be capped are placed on the support and the support lifted, bringing the bottles carried thereby simultaneously into filling position and capping position.

It will be understood that the invention is not to be limited to the precise construction and arrangement shown, but that changes and variations may be made in the same without departing therefrom.

What is claimed is:—

1. In a liquid filling mechanism, the combination of a tank, a measuring receptacle located in the tank for measuring out a predetermined quantity of liquid, a sleeve on which the measuring receptacle is mounted, said sleeve extending through the bottom of the tank, and a filling conduit in the sleeve provided with filling openings, the sleeve being movable to cause the measuring receptacle to deliver its liquid to the filling openings of the conduit.

2. In a filling mechanism, the combination of a tank, a measuring receptacle located in the tank for measuring out a predetermined quantity of liquid, a sleeve on which the measuring receptacle is mounted, a filling conduit in the sleeve provided with filling openings, a support for the article to be filled, and means for moving the support to cause an article thereon to move the sleeve to bring the measuring receptacle into position to deliver its liquid to the filling opening of the conduit and through it to the article.

3. In a filling mechanism, the combination of a source of liquid supply, a measuring receptacle for measuring out a predetermined quantity of liquid from the source of supply, a stationary filling conduit to which the measuring receptacle is arranged to deliver, a support for the article to be filled, and means for moving the support so that the movement of the support acts to introduce the filling conduit into the article carried by the support and causes the article to move the receptacle into position to deliver its contents to the filling conduit.

4. In a filling mechanism, the combination of a source of liquid supply, a measuring receptacle for measuring out a predetermined quantity of liquid from the source of supply, a stationary filling conduit to which the measuring receptacle is arranged to deliver, a support for the article to be filled and means for moving it, and connections whereby the movement of the article introduces the filling conduit into the article and actuates the measuring receptacle to cause it to deliver the liquid to the filling conduit.

5. In a filling mechanism, the combination of a tank for holding liquid, a measuring receptacle located in the tank and normally held below the surface of the liquid, a stationary filling conduit to which the measuring receptacle is arranged to deliver, a support for the article to be filled, means for moving the support to introduce the filling conduit into the article and to cause the article to actuate the measuring receptacle to cause it to deliver its liquid to said filling conduit and to move the filled article away from the conduit, and a spring for returning the measuring receptacle to normal position when the filled article is moved away from the conduit.

In testimony whereof, I have hereunto set my hand, in the presence of two subscribing witnesses.

NORBERT M. LA PORTE.

Witnesses:
WILLIAM T. HALL,
CHAS. A. PUMPHREY.